United States Patent

Sharman et al.

[11] Patent Number: 5,978,105
[45] Date of Patent: Nov. 2, 1999

[54] SCANNING OF IMAGES

[75] Inventors: Richard A. Sharman, Dunstable; John A. Weldy, Harrow-on-the-Hill, both of United Kingdom

[73] Assignee: Eastman Kodak Company, Rochester, N.Y.

[21] Appl. No.: 08/882,273

[22] Filed: Jun. 25, 1997

[51] Int. Cl.$^6$ ...................................................... H04N 1/56
[52] U.S. Cl. .......................... 358/512; 358/504; 358/527
[58] Field of Search ................................. 358/512, 527, 358/504; 382/132; 348/273, 290, 222, 229; H04N 1/46, 1/56

[56] References Cited

U.S. PATENT DOCUMENTS

| | | | |
|---|---|---|---|
| 3,784,377 | 1/1974 | Levy et al. | 96/23 |
| 4,153,463 | 5/1979 | Lea | 96/114.1 |
| 4,230,795 | 10/1980 | Krause | 430/503 |
| 4,370,396 | 1/1983 | Sato et al. | 430/7 |
| 4,383,017 | 5/1983 | Hirofumi et al. | 430/7 |
| 4,397,928 | 8/1983 | Sato et al. | 430/7 |
| 4,450,215 | 5/1984 | Reithel et al. | 430/7 |
| 4,764,670 | 8/1988 | Pace et al. | 250/226 |
| 4,876,166 | 10/1989 | Wake et al. | 430/7 |
| 4,876,167 | 10/1989 | Snow et al. | 430/7 |
| 4,971,869 | 11/1990 | Plummer | 430/7 |
| 4,975,410 | 12/1990 | Weber et al. | 503/227 |
| 4,978,652 | 12/1990 | Simons | 503/227 |
| 4,987,043 | 1/1991 | Roosen et al. | 430/7 |
| 5,051,762 | 9/1991 | Lea | 354/4 |
| 5,061,036 | 10/1991 | Gordon . | |
| 5,077,155 | 12/1991 | Simons | 430/7 |
| 5,122,428 | 6/1992 | Simons | 430/7 |
| 5,229,232 | 7/1993 | Longobardi et al. | 430/7 |
| 5,555,085 | 9/1996 | Bogdanowicz et al. | 356/300 |
| 5,555,106 | 9/1996 | Hsu | 358/512 |
| 5,828,406 | 10/1998 | Parulski et al. | 348/220 |
| 5,828,793 | 10/1998 | Mann . | |

FOREIGN PATENT DOCUMENTS

| | | |
|---|---|---|
| 0 300 667 | 1/1989 | European Pat. Off. . |
| 0 500 220 | 8/1992 | European Pat. Off. . |
| 0 526 931 | 2/1993 | European Pat. Off. . |
| 0 615 161 | 9/1994 | European Pat. Off. . |

*Primary Examiner*—Kim Yen Vu
*Attorney, Agent, or Firm*—Frank Pincelli

[57] ABSTRACT

Described herein is a method of scanning an image formed on a color filter array film using a monochrome scanner. The image forming layer of the film is chosen so as to have a maximum density which occupies a small portion of the dynamic density range of the scanner, the excess density range of the scanner being used to decode the colors of the color filter array.

9 Claims, 3 Drawing Sheets

SCANNING OF IMAGES

FIELD OF THE INVENTION

The present invention relates to the scanning of images and is more particularly concerned with the opto-electronic scanning of photographic images formed on a photographic material containing an integral color filter array.

BACKGROUND OF THE INVENTION

Photographic film materials are known in which a black-and-white photographic film emulsion is coated onto a substrate and covered with a colored pattern.

One such film material is described in U.S. Pat. No. 4,971,869, which includes a black-and-white photographic film emulsion which is coated onto a substrate. The emulsion is covered with a repetitive pattern of a triad of color stripes, such as, yellow, green and cyan stripes, where at least one of the colors is a non-primary color. Alternatively, color stripes of unsaturated hues, such as, for example, pastel yellow, pastel green and pastel cyan stripes, where one of the colors is a non-primary unsaturated hue, may be used. In a further embodiment, color stripes of unsaturated hues of any color could be used.

Full color prints or enlargements are made from images recorded on a color film as described in U.S. Pat. No. 4,971,869 are made by a hybrid process in which the film is electronically scanned to extract color information and an optical or electronic method is used to extract detail information.

U.S. Pat. No. 4,397,928 discloses a process for producing a color solid image pick-up element base plate. The process comprises the steps of a) coating a solvent permeation preventing layer on the base plate with a silver halide emulsion layer; b) forming a micro-color filter composed of at least two-color separation filter elements by repeatedly applying an image exposure and a color development to the silver halide emulsion layer for each color; c) forming a protective layer on the whole surface of the solid image pick-up element base plate; and d) removing the protective layer corresponding to bonding pat portions of the solid image pick-up element base plate to reveal the bonding pat portions. It is preferred that a blackened silver pattern is formed in the silver halide emulsion layer at the portions which correspond to the bonding pat portions by applying a light exposure to those portions and processing the emulsion layer using a black-and-white development after the formation of the micro-color filter and before the formation of the protective layer.

U.S. Pat. No. 5,077,155 discloses a process for imaging opaque grid lines for a color filter array element. The process comprises the steps of a) exposing a photographic element comprising an unhardened gelatin-silver halide emulsion coated onto a support to light through a mask which defines the grid pattern, at a total dry weight coverage of at least 0.5 $gm^{-2}$; b) developing the element with a tanning developer to develop the exposed areas of the grid lines; c) washing off the undeveloped emulsion leaving the grid line pattern; and d) drying the element to produce open cells divided by opaque lines of silver in hardened gelatin which are greater than 0.3 mm in height above the support. Optionally, the cellular element so formed is coated with a polymer dye-receiving layer and individual dyes are thermally transferred to form a color filter array element having a repeating mosaic pattern of colorants in a polymer binder which comprises color patches bounded by opaque lines in a grid pattern.

EP 0 615 161 discloses a photographic print material for the preparation of a multi-color filter array which comprises a glass support carrying separate silver halide emulsion layers which are sensitive to blue, green and red light respectively, each layer respectively containing yellow, magenta and cyan dye forming color couplers. The red-sensitive layer is furthest from the support and each emulsion layer has the equivalent ratio of silver halide to color coupler of at least 1. The print material is pixel wise exposed and processed to give a color matrix of blue, green and red pixels by subtractive color photography. The multi-color filter array element so formed may be used in a multi-color liquid crystal display device.

Other color filter arrays and methods of making such arrays are described in U.S. Pat. Nos. 4,383,017, 4,370,396, 4,450,215, 4,764,670, 4,876,166, 4,876,167, 4,923,860, 4,975,410, 4,978,652, 4,987,043, 5,122,428 and U.S. Pat. No. 5,229,232.

EP 0 526 931 discloses a method of extracting spectral image records from silver halide elements by producing spectrally non-co-extensive images by processing the element, scanning these images and deriving image records which correspond to the scanned images. The element has N+1 silver halide layer units where N=1 to 9 and the processing produces silver images in all N+1 units, the dyes being distinguishable from the other dye images in at least N units. A first image record is obtained by scanning in a spectral region of the silver absorption and minimal dye absorption. Further scans are performed in N spectral regions corresponding to the different dye images, all the information from all the scans being converted to N+1 image records. Simplified silver halide processing is provided in that the silver image is not bleached, and optionally, fixing can also be eliminated.

Scanners for scanning photographic material including a color filter array tend to be complex as several passes may need to be made of the material to extract all the color information. In such scanners, the sensor may be a color sensor having areas which are sensitive to radiation in different wavelength bands and a single pass of the material being scanned is required. Alternatively, the scanner may include filters for the sensor which, for each pass of the scanner, extract one color record from the material. In either case, the extracted color records are then aligned to reconstruct a color image. Registration problems may be experienced when aligning the color records.

SUMMARY OF THE INVENTION

It is, therefore, an object of the present invention to provide an improved scanning system for photographic materials including color filter arrays.

In accordance with one aspect of the present invention, there is provided a method of scanning an image formed on a color filter array film using a monochrome scanner having a known dynamic range, the color filter array film comprising an emulsion image forming layer formed on a support with an integral color filter array, the method comprising:

illuminating the color filter array film with light tailored to the dyes of the color filter array; and scanning the color filter array film to obtain information stored thereon;

the method being characterized by the steps of limiting the density range of the image forming layer and of dividing the dynamic range of the scanner so that each color in the color filter array occupies a discrete portion thereof.

In one embodiment of the present invention, the color filter array comprises a pattern of repeating red, green and blue stripes, the density range of the scanner being divided into three density ranges. In this embodiment, the green information occupies the lowest density range of the scanner, and the red information and the blue information, respectively, occupy the central density range and the upper density range of the scanner.

Preferably, the color filter array film is illuminated with light passing through a Wratten number 11 filter. Alternatively, a green color correction filter may be used.

In another embodiment of the present invention, the color filter array comprises a pattern of alternating lines, each line having alternating blocks of two colors, odd lines of the pattern having alternating blocks of red and green and even lines of the pattern, alternating blocks of green and blue, the green information occupying the central density range of the scanner. In this case, the red information occupies the lowest density range, and the blue information the upper density range of the scanner.

The color filter array film may be illuminated with light passing through a combination of yellow and red correction filters.

In this way, a monochrome sensor can be used in a simplified scanner without the need for further color filters.

Moreover, the photographic material can be scanned in a single pass to extract the color records for reconstruction of a color image. This has the additional advantage that there is no need to align the color records thereby overcoming registration problems.

The method of the present invention also allows the individual elements of the color filter array to be easily detected.

BRIEF DESCRIPTION OF THE DRAWINGS

For a better understanding of the present invention, reference will now be made, by way of example only, to the accompanying drawings in which.

DETAILED DESCRIPTION OF THE INVENTION

The present invention relates to the opto-electronic scanning of a photographic material comprising a single black-and-white emulsion layer incorporating a color filter array. Such a photographic material will be referred to herein as an integral color filter array film or CFA film. The density range of the emulsion layer of the CFA film is restricted so that it occupies only a small part of the dynamic range of a monochrome scanner, the excess dynamic range being used to differentiate between different colors of the color filter array.

In particular, the choice of the color or filtration of the scanner illumination allows the density range of a scanner to be divided into separate bands, one for each color record.

Naturally, the scanner for the CFA film is chosen so that it has a suitable dynamic range which allows the differentiation between different colors of the color filter array.

The dynamic range of a typical high quality film scanner is generally in excess of 300:1 or over 2.5 in density. If the density range of the image forming layer (black-and-white emulsion layer) in a CFA film is limited to a maximum density, $D_{max}$, of 0.5, then the excess density range of the scanner can be used to decode the colors of the color filter array.

In one embodiment of the present invention, the density range 0 to 0.5 of the scanner be used for one color of the color filter array and the remaining range of the scanner, that is, the density range from 0.5 to 2.5, is used for the other color(s) of the color filter array.

In a CFA film with three colors in the color filter array, namely, red, green and blue, it is desired that the green or luminance information should occupy the lowest density range of the scanner to achieve the best overall system performance. The next density range is occupied by the red information and the following density range by the blue information.

Figure 1:
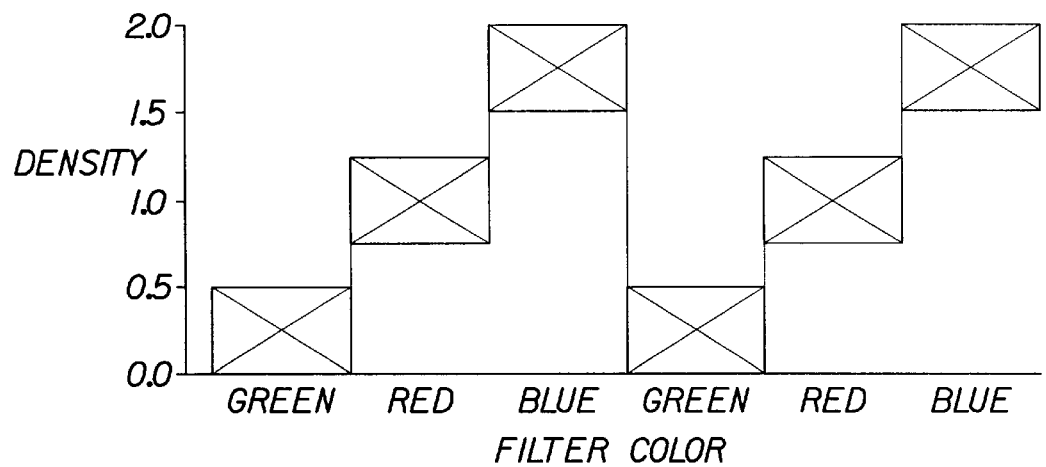
FIG. 1 illustrates a density distribution for a three-color (red/green/blue) filter array in accordance with the present invention.

For example, if the image forming or emulsion layer of the CFA film has a density range of 0.5, the green or luminance information occupies the range 0 to 0.5. Allowing for a guard band having a density range of 0.25, the combination of the scanner filtration and the integral red filter on the CFA film gives a minimum density, $D_{min}$, in the red of 0.75. The emulsion which has been exposed through the integral red filter then has a maximum density, $D_{max}$, of 0.5 resulting in the red information occupying a density range from 0.75 to 1.25. Similarly, for the blue, the combination of the scanner filtration and the integral blue filter on the CFA film gives a $D_{min}$ of 1.5. The emulsion which has been exposed through the integral blue filter also has a $D_{max}$ of 0.5 resulting in a density range for the blue information from 1.5 to 2.0 which includes a guard band of 0.25 between the red and blue information. The scanner density distribution for such a suitably illuminated CFA film is shown in FIG. 1.

An example of the scanner density distribution for a CFA film 10 (described in more detail with reference to FIGS. 2 and 3 below) is illustrated wherein the color filter array comprises repeating stripes of green, red and blue. Here, the illumination for the scanner is chosen so that the green information falls within the lowest density range.

Figure 2:
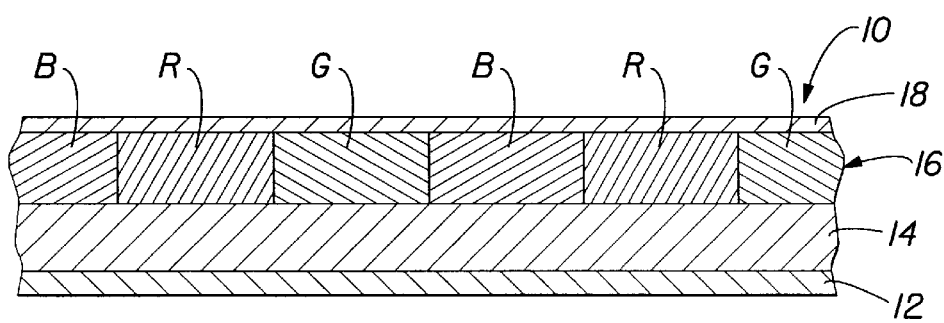
FIG. 2 is a section through a color filter array film for which the density distribution is shown in FIG. 1.
Figure 3:
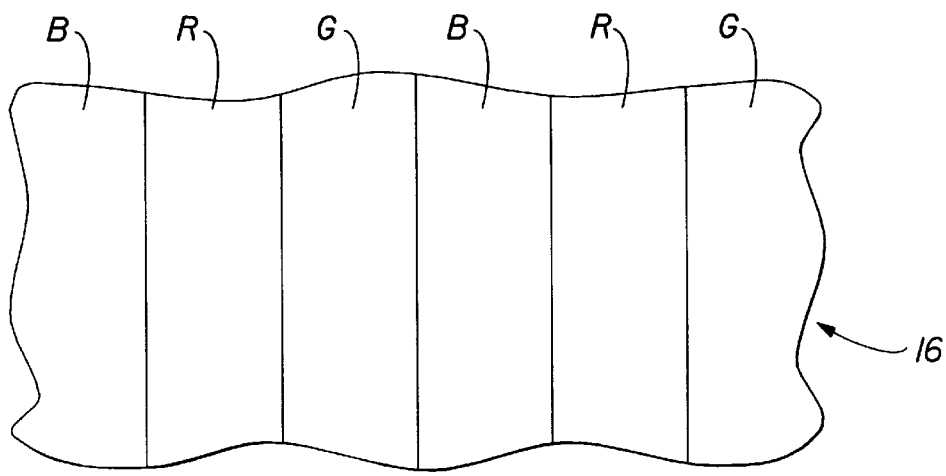
FIG. 3 illustrates the color pattern of the color filter array film shown in FIG. 2.

FIG. 2 illustrates a section through a CFA film 10. The film 10 comprises a support 12, an image forming or black-and-white emulsion layer 14 formed on the support 12, a color filter array 16 formed on the emulsion layer 14, and a protective layer 18. The CFA 16 comprises three colors, red, green and blue, arranged in repeating stripes, R, G, B, etc., over the entirety of the film as shown in FIG. 3.

It is to be noted that other density distributions can be obtained by varying the scanner filtration, and may be more appropriate for a particular application. For example, a color filter array on an imaging device is often green, red, green, red, etc. on one line and blue, green, blue, green, etc. on the next line. Such an array is shown in FIG. 4.

Figure 4:
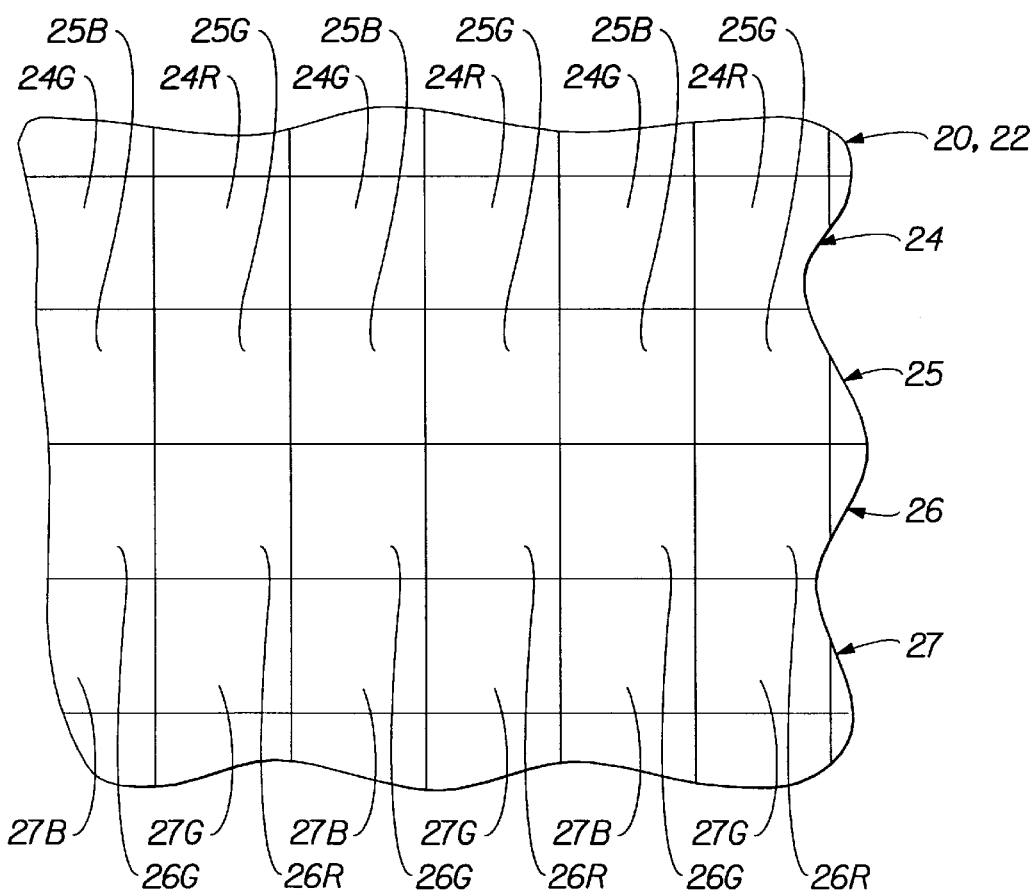
FIG. 4 illustrates the color pattern of another color filter array film.

In FIG. 4, a portion 20 of a CFA film 22 is shown. The color filter array of the film 22 comprises a plurality of lines 24,25,26,27, etc., each alternate line being configure to have the same color pattern. As shown, lines 24,26 comprise alternate red blocks 24R,26R, etc., and green blocks 24G, 26G, etc., while lines 25,27 comprise alternate green blocks 25G,27G, etc., and blue blocks 25B,27B, etc.

In a CFA film shown in FIG. 4, if the green information is retained within the lowest density range of a scanner, the density jump between the adjacent blue and green pixels could cause a degradation in the accuracy of reading the pixel value. Therefore, for the type of color filter array shown in FIG. 4, it is more appropriate that the green information occupies the central density range of the scanner so that the density jump is not so great when moving from one line to the next. The density distribution for such a CFA film is shown in FIG. 5.

Figure 5:
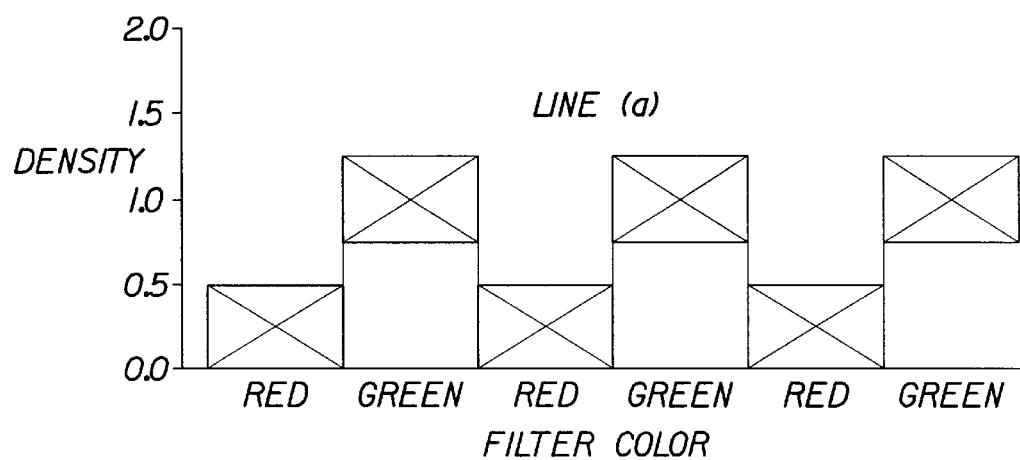
FIG. 5 illustrates a density distribution for the color filter array film shown in FIG. 4.
Figure 5:
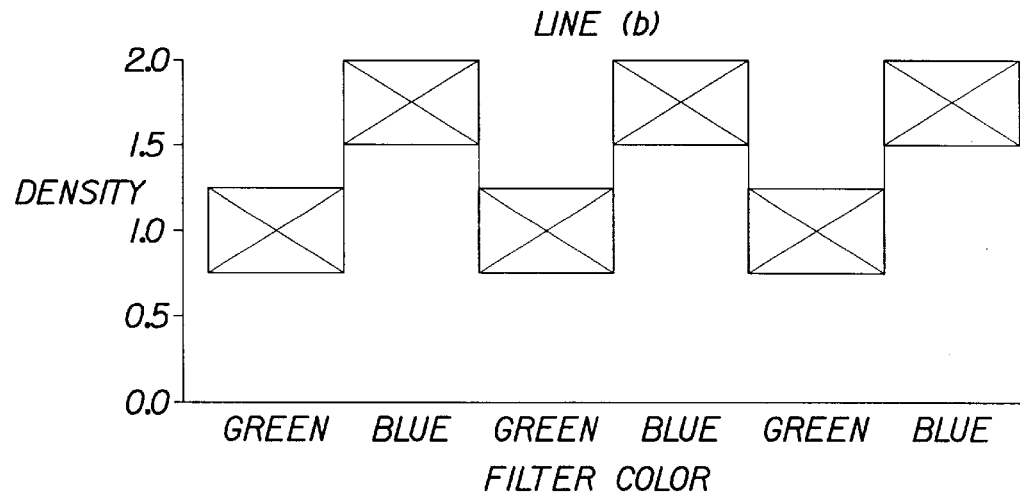

In FIG. 5, two lines of a density distribution for the CFA film shown in FIG. 4 is illustrated. For lines 24,26, etc., line (a), the red information is in the lowest density range, 0 to 0.5, of the scanner with the green information occupying the central density range, 0.75 to 1.25. Similarly, for lines 25,27, etc., line (b), the green information occupies the central density range, 0.75 to 1.25, with the blue information occupying the upper density range, 1.5 to 2.0. As before, guard bands having a density range of 0.25 are provided between the red and green information for lines 24,26, etc., and between the green and blue information for lines 25,27, etc.

In order to obtain the required distribution of density between the colors of the filter array, the color of the light passing through the CFA film to the sensor has to be tailored to suit the dyes of the filter array in the film. For example, a filter, such as a Wratten No. 11 filter which has minimum density values, $D_{min}$, of 1.88 at 450 nm (blue information), 0.3 at 550 nm (green information) and 1.1 at 650 nm (red information), provides density bands of 0.3 to 0.8 for the green information, 1.1 to 1.6 for the red information and 1.88 to 2.38 for the blue information for a CFA film with a density range of 0.5 using the scanner density distribution shown in FIG. 1. If a tungsten light source is used, then the use of a green color correction filter may be satisfactory.

In another example of the present invention, with the green information occupying the center density band as described with reference to FIGS. 4 and 5, a combination of yellow and red Wratten color correction filters can be used. A CC50Y+CC50R combination gives density values of 1.03 at 450 nm, 0.58 at 550 nm and 0.09 at 650 nm which when used with a tungsten light source will provide adequate separation between the colors.

Naturally, any other suitable combinations of filters and light sources can be used. In particular, fluorescent light sources which have well-defined spectral bands can be tailored to provide the required illumination for a particular application, that is, scanner filtration.

A reading filter color may be incorporated into the base or structure of the CFA film of the film material, for example, the base may comprise a green filter.

It is to be understood that various other changes and modifications may be made without departing form the scope of the present invention, the present invention being limited by the following claims.

| PARTS LIST | |
|---|---|
| 10 | film |
| 12 | support |
| 14 | emulsion layer |
| 16 | color filter array |
| 18 | protective layer |

-continued

| PARTS LIST | |
|---|---|
| 20 | portion |
| 22 | film |
| 24,25,26,27, etc. | lines |
| 24R,26R, etc. | red blocks |
| 24G,25G,26G,27G, etc. | green blocks |
| 25B,27B, etc. | blue blocks |

What is claimed is:

1. A method of scanning an image formed on a color filter array film using a single pass from a monochrome scanner having a known dynamic range, the color filter array film having dyes comprising at least one emulsion image forming layer formed on a support with an integral color filter array, the image forming layer having a limited density range, the method comprising:

illuminating the color filter array film with a light tailored to the dyes of the color filter array;

dividing the dynamic range of the scanner so that each color in the color filter array, modulated over said limited image forming layer density range, occupies a discrete portion thereof; and scanning the color filter array film to obtain at least one measurement of density at each pixel location, the value of the measurement relative to the dynamic range of the scanner determining both the color and density of the film image at that pixel location.

2. A method according to claim 1, wherein the color filter array comprises a pattern of repeating red, green and blue stripes, the density range of the scanner being divided into three density ranges, the green information occupying the lowest density range of the scanner.

3. A method according to claim 2, wherein the red information occupies the central density range of the scanner.

4. A method according to claim 3, wherein the blue information occupies the upper density range of the scanner.

5. A method according to claim 2, wherein the color filter array film is illuminated with light passing through a Wratten number 11 filter.

6. A method according to claim 1, wherein the color filter array comprises a pattern of alternating lines, each line having alternating blocks of two colors, odd lines of the pattern having alternating blocks of red and green and even lines of the pattern, alternating blocks of green and blue, the green information occupying the central density range of the scanner.

7. A method according to claim 6, wherein the red information occupies the lowest density range of the scanner.

8. A method according to claim 7, wherein the blue information occupies the upper density range of the scanner.

9. A method according to claim 6, wherein the color filter array film is illuminated with light passing through a combination of yellow and red correction filters.

* * * * *